United States Patent [19]

Hallerbäck

[11] Patent Number: 4,587,715
[45] Date of Patent: May 13, 1986

[54] MOUNTING TOOL

[75] Inventor: Stig L. Hallerbäck, 421 74 Västra Frölunda, Sweden

[73] Assignee: Aktiebolaget SKF, Gotebort, Sweden

[21] Appl. No.: 574,745

[22] Filed: Jan. 30, 1984

[30] Foreign Application Priority Data

Mar. 7, 1983 [SE] Sweden .................. 8301218

[51] Int. Cl.⁴ .................................. B25B 27/02
[52] U.S. Cl. .................................. 29/525; 29/280; 29/283
[58] Field of Search .......... 29/234, 255, 263, 280, 29/282, 525; 403/362; 33/163, 164 R

[56] References Cited

U.S. PATENT DOCUMENTS

| | | | |
|---|---|---|---|
| 1,412,469 | 4/1922 | Jimerson | 403/362 X |
| 3,030,702 | 4/1962 | Fowler | 29/280 |
| 3,724,865 | 4/1973 | Cristie | 403/362 X |
| 3,907,334 | 9/1975 | Schera, Jr. | 403/362 X |
| 4,252,458 | 2/1981 | Keens | 403/362 X |
| 4,259,774 | 4/1981 | Dolinski et al. | 29/263 |

FOREIGN PATENT DOCUMENTS 412792  3/1980  Sweden .

*Primary Examiner*—Frederick R. Schmidt
*Assistant Examiner*—Steven P. Schad
*Attorney, Agent, or Firm*—Eugene E. Renz, Jr.

[57] ABSTRACT

A mounting tool for fitting machine elements such as rolling bearings on a shaft.

Such elements shall be mounted with a desired radial expansion. In order to obtain this expansion the mounting tool incorporates a first driving up sleeve (5), which is intended to co-operate with tapering sleeves (3,4) which actually mount the element on the shaft. The driving up sleeve (5) is arranged with an axially adjustable spacing ring (6) adjustable to a predetermined position calculated to produce the desired expansion.

3 Claims, 1 Drawing Figure

U.S. Patent
May 13, 1986
4,587,715
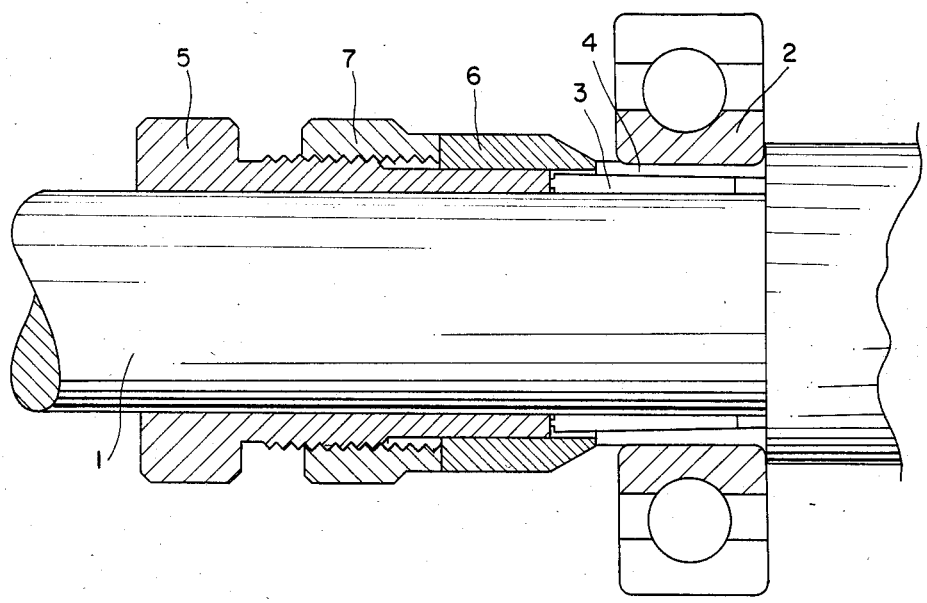

MOUNTING TOOL

BACKGROUND OF THE INVENTION

The present invention refers to a mounting tool for fitting machine elements, such as rolling bearings, to a shaft or the like.

Machine elements, such as rolling bearings, are generally mounted on a shaft thereby that a member, which oftenly is provided with a tapering bore, is fitted on a tapering sleeve and is driven up on this by means of a nut, which enters on a threaded cylindrical end of the tapering sleeve. At a sufficient tightening of the nut the member then will expand somewhat in radial direction and tensions will arise, which clamp the member to the shaft via the tapering sleeve. The tightened nut is then oftenly arrested in its position by means of a locking washer.

If the machine member is a rolling bearing then it is important that the radial expansion of the inner race ring which is fitted to the shaft via the tapering sleeve can be calculated. It is namely so that a certain play must be at hand in a rolling bearing to allow the bearing to operate satisfactorily. If therefore the driving up of the inner race ring on the tapering shaft is too big then the radial expansion thereof will also be too big and the play in the bearing will be too small. In order to calculate this play to some extent it is used a so called dynamometric wrench, by means of which the nut is tightened and on which it is possible to read the moment by which the nut has been put under load. By way of experience it is then possible to forecast the play the bearing will receive. This is no certain method and in some cases the play of the bearing must be measured with particular methods.

SUMMARY OF THE INVENTION

By the present invention it has been provided a mounting tool and a method for mounting machine elements on shafts or the like in which in a simple manner the desired play can be acheived. The invention is characterized thereby that the mounting tool, which is intended to accompolish the fitting of the machine element on a shaft or the like by means of one or more tapering sleeves, incorporates a first driving up sleeve intended to co-operate with the tapering sleeve or one of the tapering sleeves and that an axially adjustable spacing ring is arranged on or in the driving up sleeve.

The spacing ring can be provided with internal threads which co-operate with external threads on the driving up sleeve. It can also be provided with a stop screw for arresting the same.

A separate stop ring with internal threads can according to the invention be arranged on the driving up sleeve for restriction of the axial movement of the spacing ring.

The invention also incorporates a method for mounting a machine element, such as rolling bearing on a shaft with use of the mounting tool according to the invention and this method is characterized thereby that the driving up sleeve of the mounting tool is brought to drive up the tapering sleeve until a radial expansion of the element is just ready to begin, whereupon the spacing ring is pushed back a distance calculated for the expansion of the element whereupon the driving up sleeve is driven further until the spacing ring again contacts the element.

DESCRIPTION OF THE DRAWING

These and other objects of the present invention and the features and details of the operation and construction thereof are hereinafter more fully set forth in the accompanying drawings, wherein:

FIG. 1 is a sectional view of a mounting tool in accordance with the present invention during mounting of a ball bearing on a shaft.

DESCRIPTION OF THE PREFERRED EMBODIMENT

The drawing shows a shaft 1 on which is fitted a ball bearing 2, which shall be connected by means of two oppositely tapered sleeves 3 and 4. These sleeves can be made from plastic material and they are further described in Swedish patent specification No. 412.792. On the shaft 1 is arranged a mounting sleeve 5 according to the invention. On this mounting sleeve 5 there is in turn arranged a spacing ring 6 and stop ring 7.

When the bearing 2 shall be mounted this is arranged upon the sleeves 3 and 4 and the mounting sleeve 5 is pushed in against the tapering sleeve 3 with manual force just so hard as possible without the inner race ring beginning to expand radially. The spacing ring 6 is thereupon brought against the end of the tapering sleeve 4 by means of the stop ring 7. This stop ring 7 is then unscrewed a certain distance and the mounting sleeve 5 is thereupon made to the drive up the tapering sleeve 3 until the spacing ring 6 again contacts both the stop ring 7 and the tapering sleeve 4. The inner race ring 2 then has expanded so much as has been calculated by allowing the spacing ring 6 to move a certain distance. It is presupposed that a stop on the side of the bearing which is turned away from the mounting tool will prevent the bearing from moving axially.

The stop ring 7 and the spacing ring 6 can, if so desired, be made in one piece. It is possible to omit the threads and to allow the spacing ring 6' to slide freely, but is then necessary to be able to lock it by means of a stop screw $6_s$ or the like.

When mounting a bearing according to the invention a very accurate expansion of the inner race ring is obtained. At a size according to the scale used on the drawing it is obtained a very accurate expansion of inner race ring with about $5\mu$ if the stop ring 7 is screwed back one thread having a pitch of 5 mm. An almost linear relation between the expansion and the number of threads the stop ring is screwed back is obtained.

It is not necessary that the spacing ring 6 is arranged on the outside of the mounting sleeve. The opposite condition can also be at hand, whereby the driving up is brought about by means of the outer of these two concentric members.

The driving up sleeve can be actuated either by mechanical or hydraulical devices.

By the invention it has been provided a very simple and reliable mounting tool and a method for fitting machine elements to shafts and the like, whereby high demands on a controlled radial expansion is fulfilled. A further advantage is that it is not necessary to make on accurate machining of the shaft surface.

The invention is not limited to the embodiment shown but can be modified in several manners within the scope of the appended claims.

I claim:

1. A method for mounting a bearing assembly including inner and outer spaced rings and a plurality of rolling elements in the annular space between the rings on a shaft member by means of a pair of tapered sleeve members actuatable axially relative to one another to exert a predetermined radial seating force on the inner ring of the bearing assembly consisting of the steps of moving a mounting sleeve axially relative to the shaft to engage one of the sleeve members to effect axial displacement of said one sleeve member until a radial expansion of the inner ring is just ready to begin, engaging the other sleeve member with a spacing ring backing off the spacing ring relative to the other sleeve member a predetermined distance calculated to produce a predetermined expansion of the inner ring and then moving the mounting sleeve axially to effect further relative axial displacement of said one sleeve member until the spacing ring again contacts the other sleeve member.

2. A method for mounting a bearing assembly including inner and outer spaced rings and a plurality of rolling elements in the annular space between the rings on a shaft member by means of a tapered sleeve member disposed between the inner ring and shaft and actuatable axially to exert a predetermined radial seating force on the inner ring of the bearing assembly consisting of the steps of moving a mounting sleeve axially relative to the shaft to engage the sleeve member to effect axial displacement of the sleeve member until a radial expansion of the inner ring is just ready to begin, engaging the inner ring with a spacing ring backing off the spacing ring relative to the inner ring a predetermined distance calculated to produce a predetermined expansion of the inner ring and then moving the mounting sleeve axially to effect further relative axial displacement of the sleeve member until the spacing ring again contacts the inner ring.

3. A mounting tool for mounting a bearing assembly including inner and outer spaced rings and a plurality of rolling elements in the annular space between the rings on a shaft member with a predetermined preload or play by means of a pair of tapered sleeves operable upon axial movement relative to one another to exert a radial seating force on the inner ring of the bearing assembly comprising a mounting member movable axially on the shaft member and engageable with one of the sleeve members to actuate them axially relative to one another, a spacing ring circumscribing the mounting sleeve and actuatable axially relative thereto and positioned to engage the other sleeve member when said mounting sleeve is moved axially to actuate the sleeve members and a stop ring having internal threads cooperating with threads on the mounting sleeve to selectively control the position of the spacing ring on the mounting sleeve and thereby control preload in the bearing assembly.

* * * * *